No. 821,910. PATENTED MAY 29, 1906.
C. WESP.
SHIFTING SEAT CARRIAGE.
APPLICATION FILED SEPT. 18, 1905.

3 SHEETS—SHEET 1.

Witnesses:
E. A. Volk.
J. H. Webster.

Inventor.
Christian Wesp
By Wilhelm, Parker & Hard.
Attorneys.

No. 821,910. PATENTED MAY 29, 1906.
C. WESP.
SHIFTING SEAT CARRIAGE.
APPLICATION FILED SEPT. 18, 1905.

3 SHEETS—SHEET 2.

Witnesses:
E. A. Volk.
J. F. Webster.

Inventor:
Christian Wesp
By Wilhelm, Parker & Hard
Attorneys.

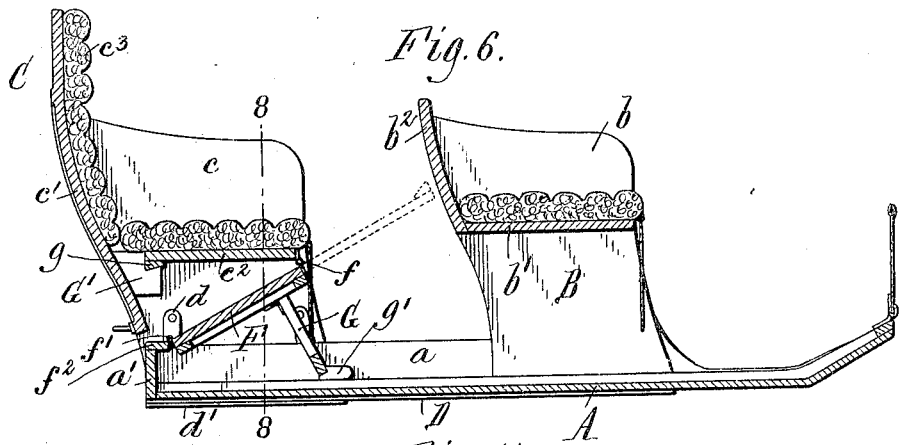
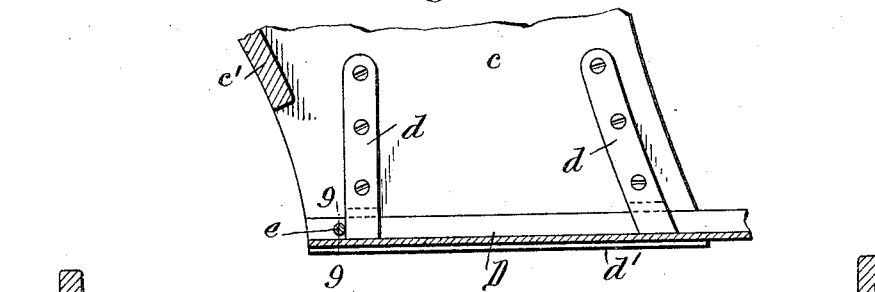
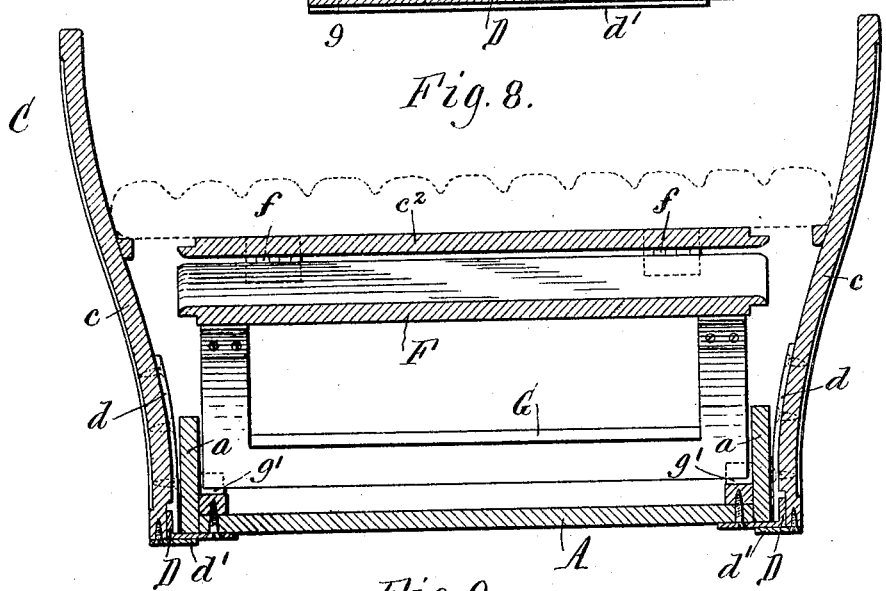
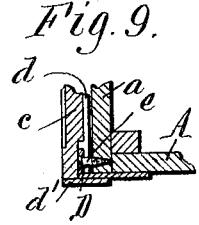

UNITED STATES PATENT OFFICE.

CHRISTIAN WESP, OF BUFFALO, NEW YORK.

SHIFTING-SEAT CARRIAGE.

No. 821,910.　　　　Specification of Letters Patent.　　　　Patented May 29, 1906.

Application filed September 18, 1905. Serial No. 278,833.

*To all whom it may concern:*

Be it known that I, CHRISTIAN WESP, a citizen of the United States, residing at Buffalo, in the county of Erie and State of New York, have invented a new and useful Improvement in Shifting-Seat Carriages, of which the following is a specification.

This invention relates to convertible one and two seated vehicles of that kind in which the rear seat is slidably mounted on the body of the vehicle and is adapted to be positioned for use at the rear portion of the body or to be moved forwardly, so as to embrace the front seat and give the vehicle the appearance of a single-seat carriage when only the front seat is to be used.

The principal objects of the invention are to produce a strong, desirable, and attractive convertible vehicle in which the front seat is stationary and free from jointed parts and is embraced by the sides and back of the rear seat, and thus hidden from view when the rear seat is in its forward inoperative position, and to provide the rear seat with a movable or folding bottom adapted to form a part of the deck or cover of the vehicle-body when the rear seat is in its forward inoperative position.

Other objects of the invention are to improve convertible vehicles in the respects hereinafter stated, and set forth in the claims.

Figure 1:
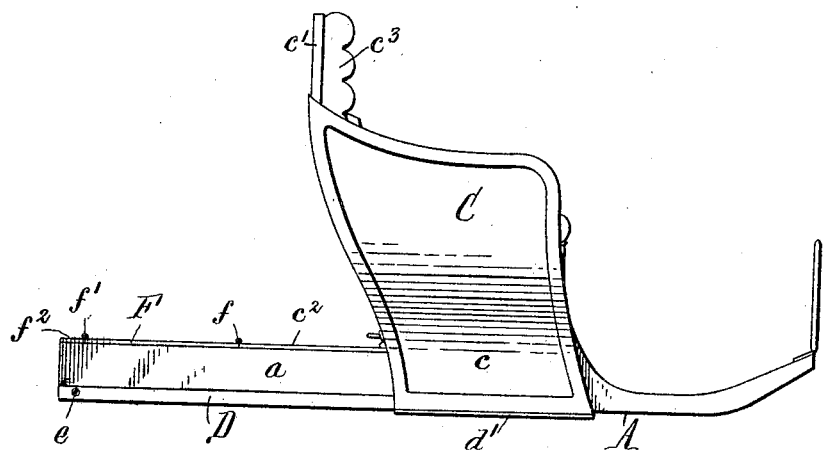
Figure 2:
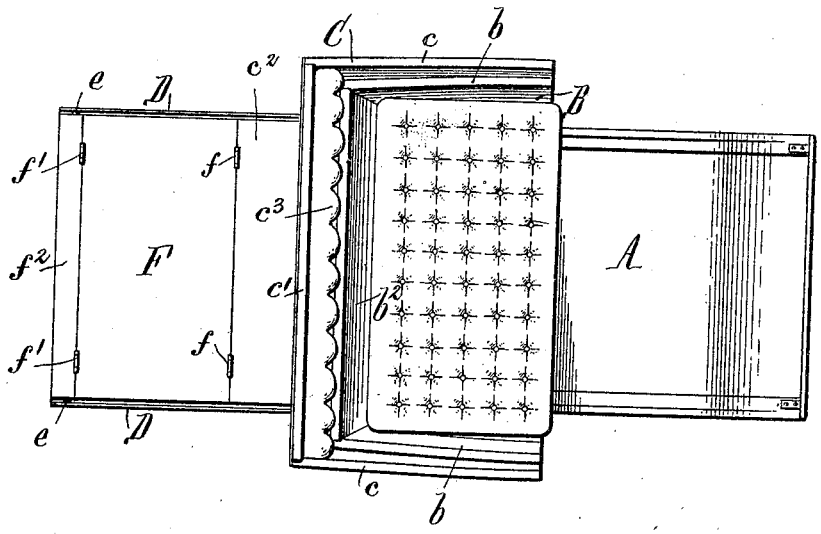
Figure 3:
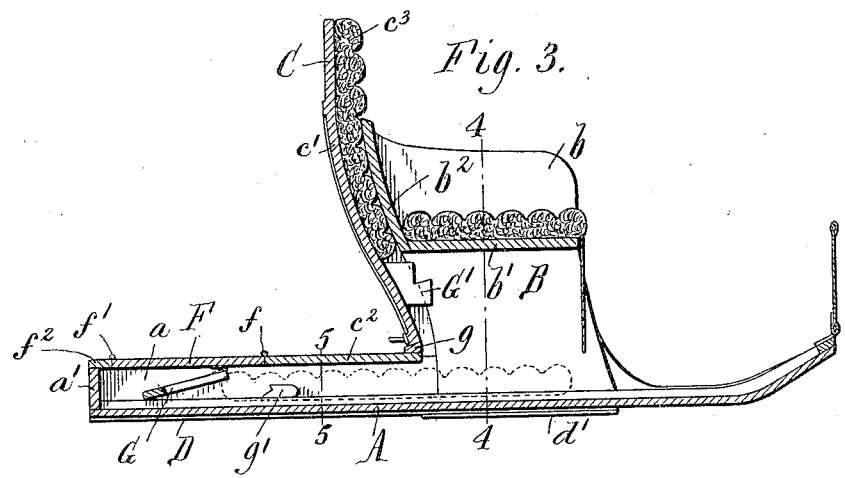
Figure 4:
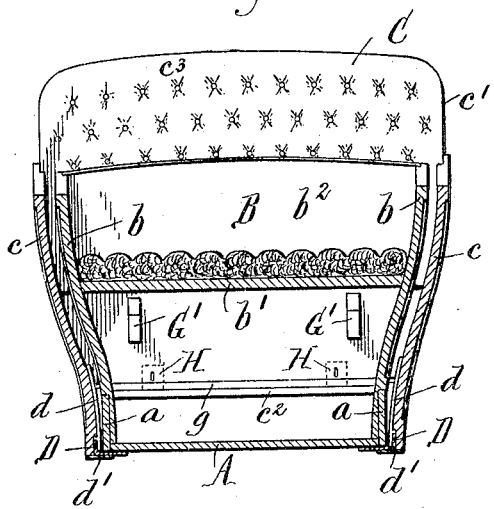
Figure 5:
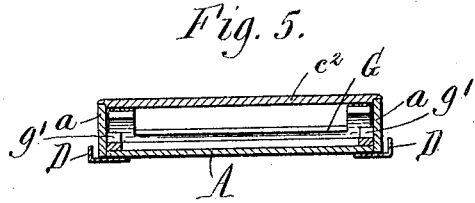

In the accompanying drawings, consisting of three sheets, Figure 1 is a side elevation of the body of a convertible vehicle embodying the invention, showing the same adjusted for use as a one-seated carriage. Fig. 2 is a plan view thereof. Fig. 3 is a longitudinal sectional elevation thereof. Fig. 4 is a transverse sectional elevation thereof in line 4 4, Fig. 3, looking toward the rear. Fig. 5 is a transverse sectional elevation of the vehicle-box in line 5 5, Fig. 3. Fig. 6 is a longitudinal sectional elevation of the vehicle adjusted for use as a two-seated surrey or carriage. Fig. 7 is a fragmentary sectional elevation, on an enlarged scale, of the rear seat and one of its guides. Fig. 8 is a transverse sectional elevation, on an enlarged scale, of the rear seat in line 8 8, Fig. 6. Fig. 9 is a detail section of one of the guides and backstops for the rear seat in line 9 9, Fig. 7.

Like letters of reference refer to like parts in the several figures.

The vehicle-body has a bottom A and preferably has low upright sides $a$ and back $a'$, which form a shallow box in rear of the front seat.

The front seat B is stationary and in the construction shown in the drawings has sides $b$, which rise from the forward portion of the sides $a$ of the box and are rigidly connected by a bottom $b'$ and back $b^2$. The seat thus constructed has no jointed or movable parts, and thus is desirable, as the front seat is always used, whether the vehicle is to be operated as a single or two seated carriage, and the stationary rigid front seat is strong and durable, and there are no parts to work loose and rattle. Preferably the lower portions of the sides of the front seat are in the same vertical planes as the sides of the box, while their upper portions bulge outwardly in the usual manner to afford more seat room and lend to the attractive appearance of the vehicle.

The rear seat C is mounted in some suitable way to slide horizontally on the body and has upright sides $c$, rigidly connected by a back $c'$, and a bottom $c^2$, which is movable into and out of operative horizontal position between the sides $c$.

The rear seat is somewhat wider than the front, so that when its bottom is moved or folded out of operative position the rear seat can be slid forwardly to embrace or inclose the front seat, as shown in Figs. 1 to 4, and the sides of the rear seat are preferably similar in shape to the sides of the front seat and of such dimensions that the front and top edges of the sides of the two seats will coincide when together, so that the appearance of the front seat is very much the same whether the rear seat is in use or is closed about the front seat. The back of the rear seat terminates at its lower edge above the sides of the vehicle-box and in the vehicle illustrated is higher than that of the front seat and is provided with a back cushion $c^3$; but the backs of both seats could be the same height, and the back cushion could be omitted, if desired.

In the construction shown in the drawings the rear seat is supported by and slides on horizontal tracks or guides D at the opposite sides of the body formed by angle-bars secured to the under side of the body. The sides of the rear seat, which extend down outside of the body, have metal bars or legs $d$, Figs. 6 to 9, secured on their inner sides, which extend in between the sides of the body and the upright flanges of the tracks D and bear and slide on said tracks. Horizontal plates $d'$, secured to the bottom edges of the sides of the rear seat, project inwardly under the tracks D and prevent the disengagement of the legs $d$ from the tracks. The forward movement of the rear seat is limited by its engagement with the front seat, and its rearward movement is limited by stop-screws or the like $e$, Figs. 7 and 9, against which the rear legs $d$ strike. The means just described for supporting and guiding the rear seat in its movements are desirable and do not detract from the neat appearance of the vehicle; but any other suitable means for slidably supporting the rear seat could be employed.

The bottom $c^2$ of the rear seat is preferably formed by a board connected at its front edge by hinges $f$ to the front edge of a deck-board F, which in turn is connected at its rear edge by hinges $f'$ to a top strip $f^2$ at the rear end of the vehicle-box. The rear-seat bottom $c^2$ is supported in its operative horizontal position (shown in Fig. 6) by front and rear supports G G'. The rear support G' shown consists of brackets or blocks projecting forwardly from the back of the rear seat, upon which a cleat $g$ at the rear edge of the seat-bottom rests, while the front support G shown consists of a frame or brace hinged at its upper edge to the forward portion of the deck-board F and adapted to rest at its lower edge on the side sills of the body. Stop-blocks $g'$ are shown for preventing the brace from slipping forwardly; but these blocks are not absolutely necessary, as the square hinged ends of the brace bearing against the deck-board will hold the lower end of the brace from slipping forwardly. The supporting-brackets and brace rigidly hold the bottom in horizontal position, and as the bottom is connected to the deck-board, which in turn is connected to the vehicle-box and held up by the brace, the bottom when in position on the rear support locks the rear seat from forward movement. The rear seat cannot be slid forwardly until its bottom is moved out of engagement with the supporting-brackets on its back.

When the rear seat is in use and it is desired to convert the carriage into a one-seated vehicle, the bottom of the rear seat is lifted off of its rear supports G', and it and the deck-board F are swung upwardly until the brace G can be reached and folded back against the under side of the deck-board. The bottom $c^2$ can then be swung forwardly on its hinge connection with the deck-board, as indicated by broken lines in Fig. 6, and lowered, together with the deck-board, to the horizontal position shown in Fig. 3. The bottom and deck-board rest when lowered on the top edges of the sides of the box and form a deck or cover for the box. After the bottom and deck-board have been thus turned down the rear seat can be slid forwardly over them to the position shown in Figs. 1 to 3. When the bottom of the rear seat is turned down, as described, the cleat $g$ projects upwardly from its then forward edge and serves to close the space between the lower edge of the back of the rear seat and the top of the box. To reconvert to a two-seated vehicle, the rear seat is first slid back to its rear position, the bottom and deck-board are raised, the brace swung forwardly against the stop-blocks, and the bottom turned down until it rests upon its rear supports G'. When the rear seat is provided with a bottom cushion, as shown, the cushion is removed before the bottom is turned down. The cushion can be stored away in the box, as indicated by dotted lines in Fig. 3.

In the vehicle shown in the drawings the bottom of the rear seat is lower than that of the front seat, as it is desirable to have the driver's seat higher than the rear seat; but with the bottom of the rear seat movable out of normal position to allow the forward movement of the rear seat it could be made either the same height or higher than the front-seat bottom.

The construction described in which the bottom of the rear seat forms when turned down a part of the deck of the box and in which the bottom is supported by the front and rear supports G G' is preferred; but the seat could be otherwise supported and arranged to be moved to a position enabling the rear seat to be moved forwardly to convert from a two-seated to a one-seated vehicle.

The rear seat can be locked from movement in its forward position by any suitable means. Ordinary key-operated locks are employed for this purpose and are indicated by dotted lines at H in Fig. 4 on the lower part of the back of the rear seat. The lock-bolts are adapted to engage in keepers on the adjacent edge of the rear-seat bottom when the bottom is turned down.

I claim as my invention—

1. In a convertible vehicle, the combination of a front seat, and a rear seat mounted to slide toward the front seat and having a bottom which is movable out of its operative horizontal position to allow the rear seat to embrace the sides and back of the front seat, substantially as set forth.

2. In a convertible vehicle, the combination of a stationary front seat, and a rear seat mounted to slide toward the front seat and comprising rigidly-connected sides and back and a bottom which is movable from between said sides to allow the rear seat to embrace the sides and back of the front seat, substantially as set forth.

3. In a convertible vehicle, the combination of a stationary front seat comprising sides, a back and a bottom all rigidly connected, and a rear seat which is of substantially the same form but of greater width than the front seat and is mounted to slide toward the front seat, said rear seat comprising rigidly-connected sides and back and a bottom which is movable from its operative position to allow the rear seat to embrace the sides and back of the front seat, substantially as set forth.

4. In a convertible vehicle, the combination of a front seat, a rear seat mounted to slide toward the front seat and having a bottom which is movable out of its operative horizontal position to enable the rear seat to embrace the sides and back of the front seat, and means for supporting said bottom in operative position and which coöperate with said bottom to lock said rear seat from forward movement, substantially as set forth.

5. In a convertible vehicle, the combination of a front seat, a box projecting to the rear of the front seat, and a rear seat mounted to slide over said box toward the front seat and having a bottom which is movable from its operative position to allow the rear seat to embrace the front seat, and to form a partial deck for said box, substantially as set forth.

6. In a convertible vehicle, the combination of a front seat, a box projecting to the rear of the front seat, and a rear seat mounted to slide over said box toward the front seat and having a movable bottom, a deck-board hinged at its rear to said box and at its front to said bottom, said bottom being arranged to turn down and lowered with said deck-board and form with the deck-board a deck for said box, substantially as set forth.

7. In a convertible vehicle, the combination of a front seat, a box projecting to the rear of the front seat, and a rear seat mounted to slide over said box toward the front seat and having a movable bottom, a deck-board hinged at its rear to said box and at its front to said bottom, a front support for said bottom connected to said deck-board, and rear supports for said bottom on the back of said rear seat, substantially as set forth.

8. In a convertible vehicle, the combination of a front seat, a box projecting to the rear of the front seat, and a rear seat mounted to slide over said box toward the front seat and having a bottom which is movable from its operative position to allow the rear seat to embrace the front seat, and to form a partial deck for said box, said bottom having at one edge a strip or cleat which bears on supports to hold the bottom in operative position and closes the space between the back of the rear seat and said box when the bottom is moved out of operative position and the rear seat is moved forwardly, substantially as set forth.

Witness my hand this 11th day of September, 1905.

CHRISTIAN WESP.

Witnesses:
 EDWARD C. HARD,
 A. L. MCGEE.